United States Patent
Astley et al.

(10) Patent No.: US 7,525,964 B2
(45) Date of Patent: Apr. 28, 2009

(54) MECHANISM FOR DELIVERING MESSAGES TO COMPETING CONSUMERS IN A POINT-TO-POINT SYSTEM

(75) Inventors: Mark C. Astley, Pompton Lakes, NJ (US); Andrew D. J. Banks, Romsey (GB); Sumeer K. Bhola, New York, NY (US); Ignacio Silva-Lepe, Putnam Valley, NY (US); Michael J. Ward, New Haven, CT (US); David Ware, Downton (GB)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 10/980,034

(22) Filed: Nov. 3, 2004

(65) Prior Publication Data

US 2006/0092933 A1 May 4, 2006

(51) Int. Cl.
H04L 12/24 (2006.01)
(52) U.S. Cl. .................................. 370/390; 370/392
(58) Field of Classification Search ........................ None
See application file for complete search history.

(56) References Cited

U.S. PATENT DOCUMENTS

| | | | |
|---|---|---|---|
| 6,205,498 B1 * | 3/2001 | Habusha et al. ............... 710/29 |
| 6,510,429 B1 * | 1/2003 | Todd ........................ 705/36 R |
| 6,529,932 B1 * | 3/2003 | Dadiomov et al. ........... 718/101 |
| 7,152,180 B2 * | 12/2006 | Shoaib et al. .................. 714/4 |
| 2002/0161674 A1 * | 10/2002 | Scheer ......................... 705/28 |
| 2003/0033349 A1 * | 2/2003 | Lambert et al. ............. 709/201 |
| 2003/0115317 A1 * | 6/2003 | Hickson et al. ............. 709/224 |
| 2004/0254993 A1 * | 12/2004 | Mamas ....................... 709/206 |

* cited by examiner

Primary Examiner—Edan Orgad
Assistant Examiner—Jung Park
(74) Attorney, Agent, or Firm—Ido Tuchman; Lisa M. Yamonaco

(57) ABSTRACT

A method, system, and computer program for delivering messages and data to competing consumers. One aspect of the invention includes a message delivery system including a destination messaging engine, one or more receiver messaging engines, and a message pool. The destination messaging engine is configured to distribute data from one or more producers. The receiver messaging engines are configured to request data from the destination messaging engine and transmit the data to one or more consumers. The message pool is configured to store data from the producers, with the destination messaging engine arbitrating data in the message pool among the receiver messaging engines.

1 Claim, 8 Drawing Sheets

US 7,525,964 B2

MECHANISM FOR DELIVERING MESSAGES TO COMPETING CONSUMERS IN A POINT-TO-POINT SYSTEM

FIELD OF THE INVENTION

The present invention relates generally to message delivery in point-to-point-systems, and more particularly relates to a mechanism for providing message delivery to competing consumers in a point-to-point system.

BACKGROUND

In a point-to-point messaging system, competing consumers receive messages sent by producers to a known destination. Consumers are competing in the sense that any given message produced is delivered to only one consumer. The delivery of messages features qualities of service that include reliability, ordering and duplication avoidance. In other words, messages may be delivered at least once, at most once or exactly once, and in the order given by any producer. The invention addresses the problem by providing end-to-end delivery protocols that support these qualities of service when producers, consumers and destinations are distributed across an overlay network of messaging servers.

Known solutions to this problem include the MQ Series system, where competing consumers may receive messages with similar qualities of service. Drawbacks of MQ Series include reduced scalability, flexibility and fault tolerance, given that consumers must directly attach to the messaging server that hosts the destination (queue) from which they receive messages.

SUMMARY OF THE INVENTION

The invention defines a stream-based end-to-end message delivery protocol. A destination defines one or more localization points for message arbitration. The protocol takes messages from producers and stores them at the localization point. Consumers submit requests for messages. These requests are dispatched by an arbitrator at the localization point. Each one of the producer and consumer ends relies on a stream abstraction to keep track of each message. A stream is a sequence of states where each state describes the presence or absence of a message, and the disposition of that message with respect to downstream receivers, which can be the localization point or a consumer, depending on where the stream is used.

Using stream-based message delivery protocol advantageously ensures that each message is kept while it is still needed and is removed as soon as it is not needed, to meet the qualities of service requested by producers and consumers. Furthermore, the invention avoids distributed transactions across destination localization points. That is, for transactional producers (consumers), the transaction is local to the producer (consumer) regardless of how many destinations are produced to (consumed from) in the same transaction, and where the respective localization points are located. The invention efficiently pushes the effect of producer (consumer) transactions to the localization points in a batched and asynchronous manner.

Thus, one exemplary aspect of the invention is a message delivery system. The system includes a destination messaging engine configured to distribute data from one or more producers. One or more receiver messaging engines are configured to request data from the destination messaging engine and transmit the data to one or more consumers. A message pool is configured to store data from the producers, and the destination messaging engine is configured to arbitrate data in the message pool among the receiver messaging engines.

Another exemplary aspect of the invention is a method for delivering data. The method includes an instantiating step for instantiating a destination messaging engine configured to distribute data from one or more producers. Another instantiating step instantiates one or more receiver messaging engines configured to request data from the destination messaging engine and transmit the data to one or more consumers. A message pool is configured to store data from the producers, and an arbitrating step arbitrates data in the messaging pool among the receiver messaging engines.

Yet another aspect of the invention is a computer program product embodied in a tangible media. The computer program product includes computer readable program codes coupled to the tangible media for delivering data. The computer readable program codes are configured to instantiate a destination messaging engine configured to distribute data from one or more producers. The computer readable program codes are also configured to instantiate one or more receiver messaging engines. The receiver messaging engines are configured to request data from the destination messaging engine and transmit the data to one or more consumers. The computer readable program codes are further configured to arbitrate data in a messaging pool among the receiver messaging engines, with the message pool configured to store data from the producers.

DETAILED DESCRIPTION OF THE INVENTION

Figure 1:
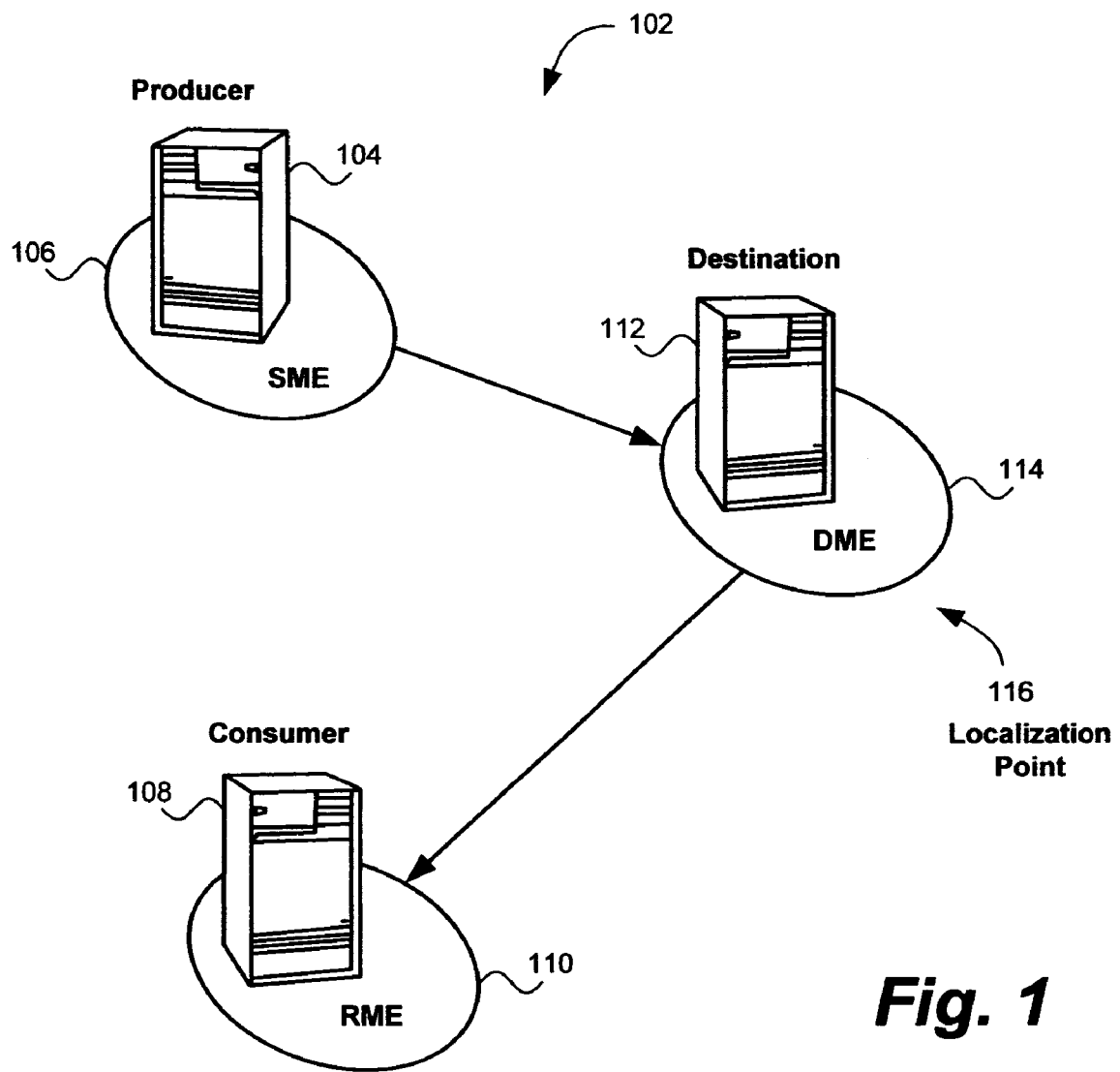
FIG. 1 shows an exemplary environment embodying the present invention.

The following description details how the present invention is employed to provide a messaging engine to messaging engine (ME-to-ME) message delivery protocol. A messaging engine (ME) is defined as a message processing machine that can accept and distribute messages. Throughout the description of the invention reference is made to FIGS. 1-8. When referring to the figures, like structures and elements shown throughout are indicated with like reference numerals.

In FIG. 1, an exemplary environment 102 embodying the present invention is shown. It is initially noted that the environment 102 is presented for illustration purposes only, and is representative of countless configurations in which the invention may be implemented. Thus, the present invention should not be considered limited to the system configuration shown in the figure.

The environment 102 includes a producer 104 hosted by a Sender ME (SME) 106 and a consumer 108 is hosted by a Receiver ME (RME) 110. In addition, a destination 112 is said to be localized at one or more Destination MEs (DMEs) 114. In other words, a localization point 116 is defined, for a given destination, as a DME 114 that holds and distributes messages to one or more RMEs 110. Any of these roles can be played concurrently by a single ME, but for clarity, they are separated in this description.

In accordance with the present invention, a message delivery protocol is described capable of supporting delivery properties that include reliability, duplication avoidance and ordering. Reliability supports at least two levels, namely, reliable delivery and best-effort delivery. For reliable delivery, a message is guaranteed to be delivered at least once. Combined with duplication avoidance, this guarantee improves to exactly once delivery. In best-effort delivery, a message could be delivered zero or more times. Combined with duplication avoidance, this guarantee improves to at most once delivery.

Ordered delivery pertains to the sequencing of messages produced at any given producer. That is, a consumer 108 can expect to see messages received from a given producer 104 to arrive in the order in which they were produced by that producer 104. A message can be assigned a (typically numeric) priority value by its producer 104. Messages with a higher priority value are intended to be delivered in advance of messages with a lower priority value, under ordered delivery.

Explanation of the delivery protocol will begin with a description of reliable delivery with duplication avoidance. Next, the delivery protocol will be described for best-effort delivery as a specialization of the reliable delivery protocol. Finally, the delivery protocol will be described for ordered delivery that pertains to both reliable and best-effort delivery.

The reliable delivery protocol pertains to the delivery of messages from a DME 114 to one or more RMEs 110. The delivery of messages to a DME 114 from one or more SMEs 106 is accomplished by a similar but simpler delivery protocol. For instance, such a protocol need not include features such as acceptance and rejection of messages, as well as initiation of the protocol by a consumer 108 at an RME 110.

In the description of the reliable delivery protocol, duplication avoidance is built in and tunable. However, certain cases where this is not possible or practical are explicitly indicated. In particular, an individual message is marked as a potential duplicate for which the duplication avoidance guarantee cannot be assured.

The reliable delivery protocol is based on the concept of a stream, which associates a state with each data message, and which defines a set of rules for changing state based on interactions between a DME 114 and an RME 110. The stream model is first described in abstract form, including how and when a stream is created. While a stream represents the state of delivery between a DME 114 and an RME 110, the delivery protocol determines how and when stream transitions may occur. Next, the delivery protocol is discussed. This description defines when state transitions occur, including a description of messages that are sent as part of the protocol. Next, a stream creation and flush protocol is given that describes the circumstances and necessary operations for creating, flushing and replacing a stream. Finally, the physical representation of a stream is described, including which parts of a stream require persistence, and startup/recovery transitions that reconstruct a stream from a persistent copy.

Figure 2:
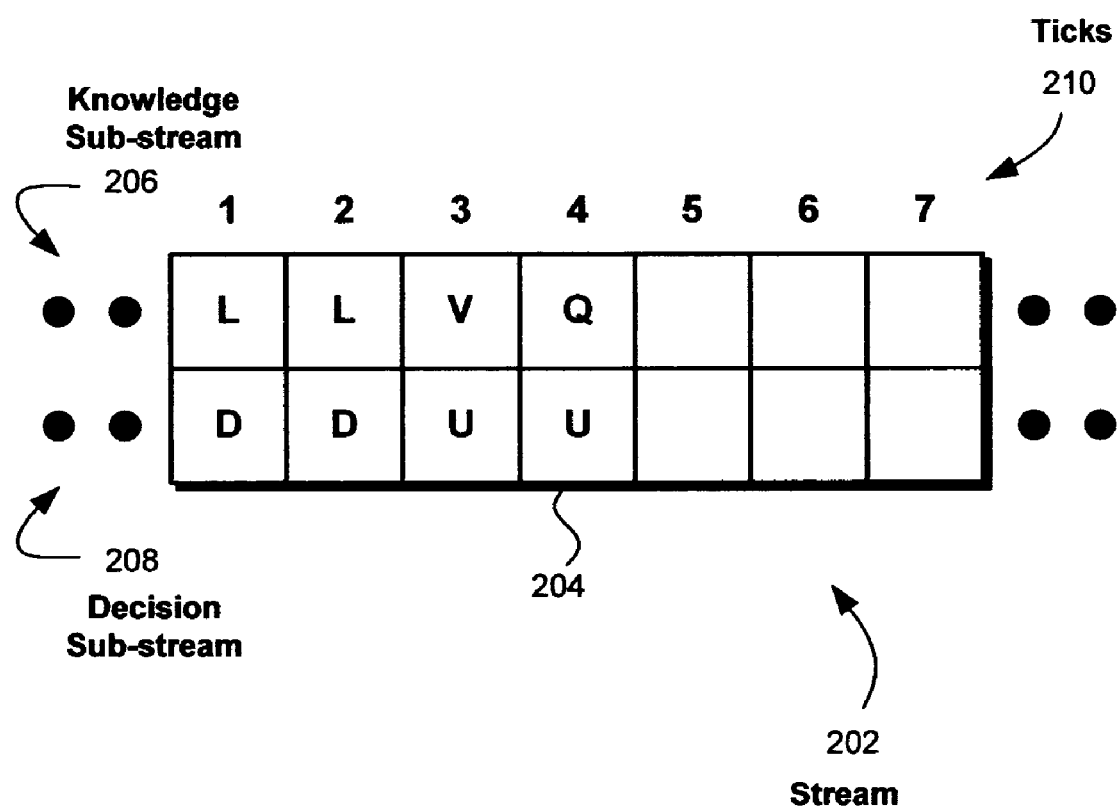
FIG. 2 is a graphical illustration depicting a representation of a protocol stream.

As illustrated in FIG. 2, a stream 202 is a sequence of states 204 where each stream state 204 describes the presence or absence of data, and the disposition of that data with respect to downstream receivers. It is convenient to view a stream 202 as consisting of a pair of sub-streams, where the knowledge sub-stream 206 conveys the presence or absence of data, and the decision sub-stream 208 conveys the disposition of data. Each state element 204 in a sub-stream is indexed by a sequence number or 'tick' 210.

The knowledge sub-stream 206 contains the following state elements 204:

TABLE 1

| Knowledge sub-stream states | |
|---|---|
| Q (Question) | No information is currently available for this tick. |
| V (Value/Data) | It is known that there is a data message for this tick (and the data is known). |
| L (Lost/Discarded) | Either the state of this tick was known but is now lost (e.g. failure and recovery from stale backup), or there is no need to remember the state anymore (e.g. all receivers have acknowledged information about this tick). |

Similarly, the decision sub-stream 208 contains the following state elements 204:

TABLE 2

| Decision sub-stream states | |
|---|---|
| U (Undecided) | A receiver has not decided the disposition of the corresponding tick in the knowledge sub-stream. |
| G (Get) | A receiver has requested data (if available) for the corresponding tick in the knowledge sub-stream; a filter may be included to select messages that satisfy the request. |
| A (Accept) | A receiver has accepted the data in the corresponding tick in the knowledge sub-stream. |
| R (Reject) | A receiver has rejected the data in the corresponding tick in the knowledge sub-stream. |
| D (Decided) | A receiver has decided the disposition of the corresponding tick in the knowledge sub-stream and it is no longer important to remember a more explicit disposition. |

Because of asynchrony, the sender and receiver maintain out-of-sync views of the same stream 202. In particular, the knowledge sub-stream 206 at the sender may be slightly ahead of the knowledge sub-stream 206 at the receiver, where "ahead" means that the sender will have fewer Q states than the receiver. Similarly, the decision sub-stream 208 at the receiver may be slightly ahead of the decision sub-stream 208 at the sender, where "ahead" means that the receiver will have fewer U states than the sender. In general, a specific state is referred to by naming the pair of knowledge and decision sub-stream elements (e.g., V/U). However, sometimes the L/D state is referred to as the "finality" state.

Figure 3:
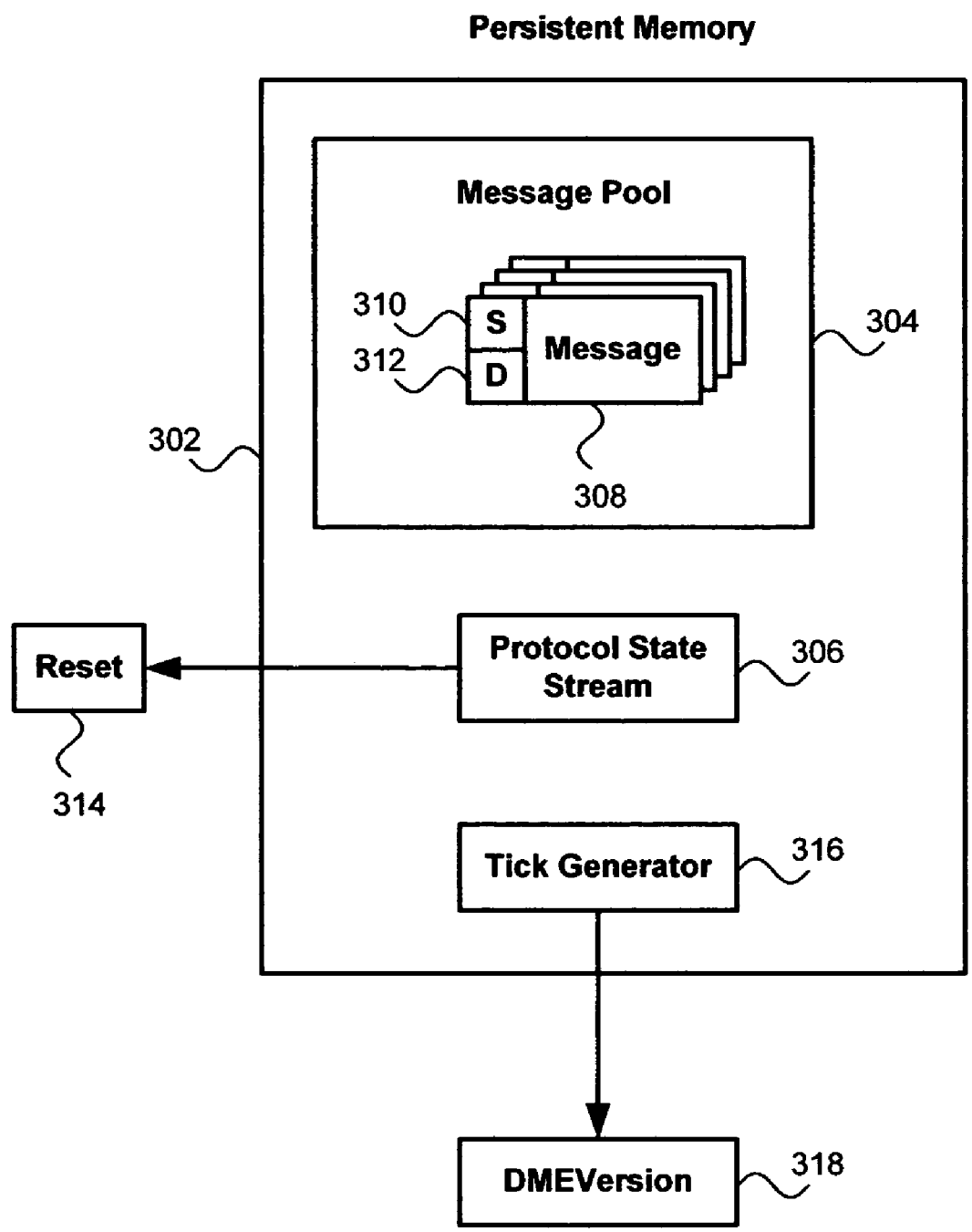
FIG. 3 shows an exemplary persistent storage maintained by a DME in accordance with the present invention.

FIG. 3 depicts an exemplary persistent storage 302 maintained by a DME in accordance with the present invention. As used herein, persistent storage is computer readable media that preserves data for a duration of time without system power and includes, but is not limited to, battery-backed RAM, magnetic storage media, optical storage media, FLASH memory, EEPROM, and the like. For each destination, a DME maintains a persistent message pool 304 and a protocol state stream 306 (consisting of knowledge and decision sub-streams) for each RME that it distributes messages to.

Messages 308 are added to the message pool 304 when received from an SME and are totally ordered in a manner that is consistent with all the SMEs' sending order. In general, messages 308 may contain information about more than one tick in the stream. However, for simplicity of exposition, each message contains exactly one tick. Messages 308 in the pool 304 have a state field 310 of assigned, unassigned, or consumed. In addition, each message has a duplicate boolean field 312 that is true if the message is a potential duplicate. The state field 310 and the duplicate field 312 are also persistent. A message 308 in the consumed state can be discarded from the pool 304 since it has been consumed by at least one RME.

A message 308 is assigned to an RME if there is an outstanding get request from the RME that this message can satisfy. Since get requests can contain a filtering predicate, messages may be assigned out of order. This does not affect ordered delivery to a single consumer, since the out of order assignment is due to different consumers (with different filters). While in the assigned state, the message 308 cannot be assigned to another RME.

The DME maintains the protocol state stream 306 (consisting of knowledge and decision sub-streams) in persistent storage 302 for each RME that is requesting/getting messages from this destination. Each stream 306 includes a non-persistent "reset" bit 314 that is set each time the DME recovers from failure and restarts the stream 306. This bit is modified by the DME/RME reset protocol described below. In one embodiment of the invention, each "get" request tick in the stream may contain a "slowed" bit that is initially unset.

The DME also maintains a persistent tick generator 316. When the DME starts (due to failure recovery or otherwise), the next tick is recorded in the non-persistent variable DME-Version 318. The tick generator 316 is always recoverable and thus DMEVersion 318 is guaranteed to be monotonic and unique.

In a large-scale deployment there may be hundreds of RMEs in the system, but only a few at any time may be requesting messages from a destination. RMEs that do not have any outstanding gets and which have communicated their decision for all messages assigned to them, take up a small constant amount of space in persistent storage. It is safe for the DME to forget G ticks in the decision sub-stream, such as when it crashes, since the G (along with the filter predicate that it must satisfy) will be repeated by the RME until it is satisfied. A discussion of how the persistent storage 302 is efficiently maintained is presented below.

Figure 4:
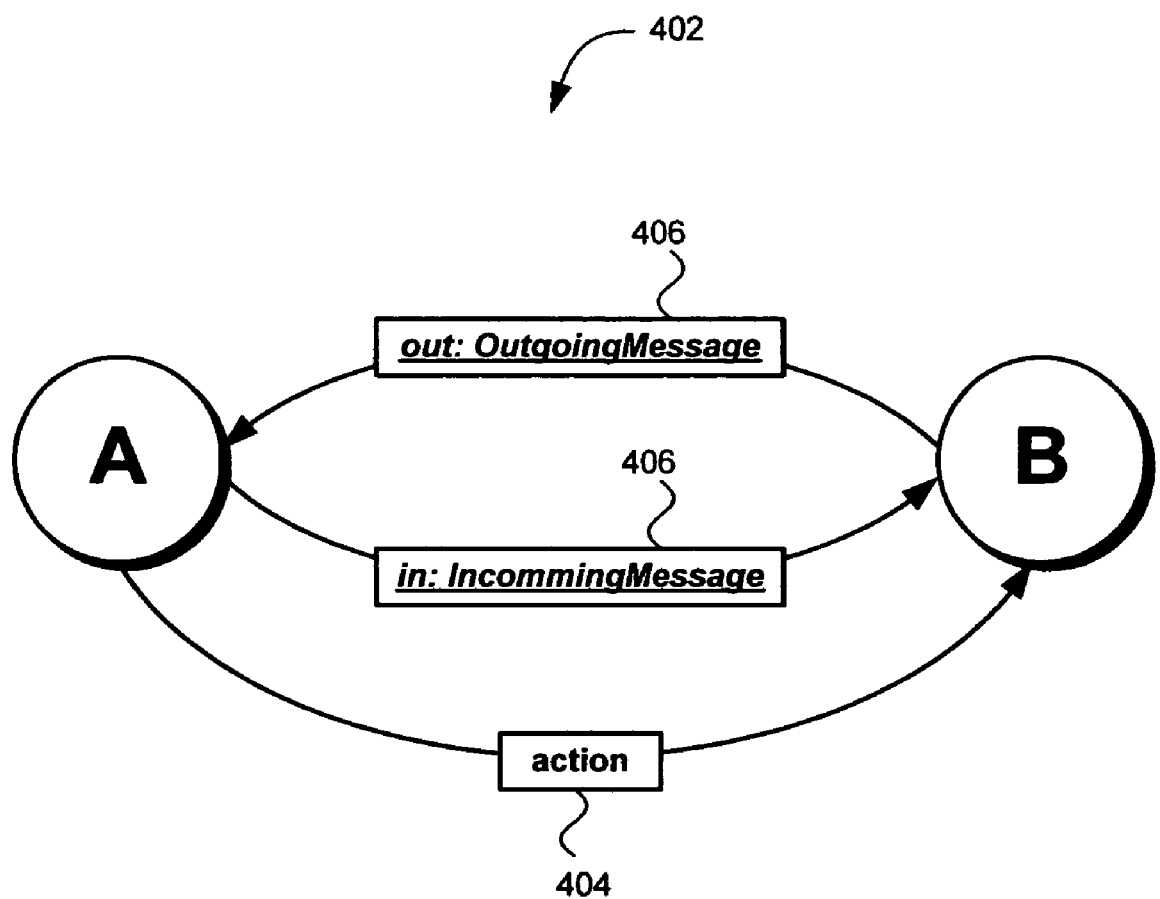
FIG. 4 is a graphical illustration depicting a sample transition diagram of the states of a particular tick in a protocol stream.

Senders and receivers update streams 202 based on messaging interactions and internal operations. If the stream contents at a particular tick are viewed as a state, then a state transition diagram may be used to describe progress in the protocol in response to messaging interactions. FIG. 4 illustrates a sample transition diagram 402. Transitions may be labeled with actions or messages. Actions 404 are plain text whereas messages 406 on a transition are indicated by underlined italics and are prefixed with "in:" to signal message receipt, and "out:" to signal message transmission.

Figure 5:
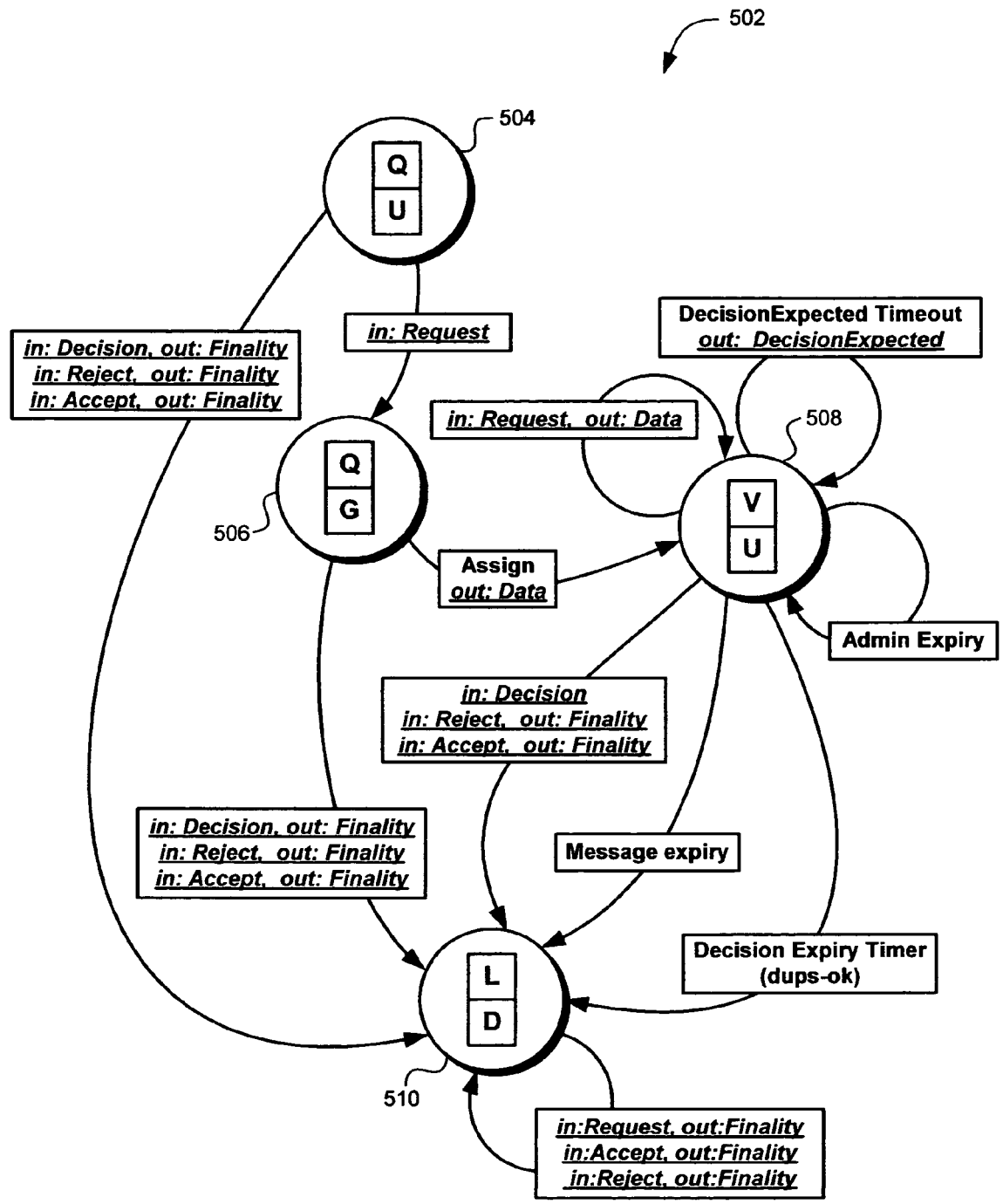
FIG. 5 illustrates a state transition diagram for the normal execution states of ticks in an exemplary protocol stream at a DME, as contemplated by the present invention.

The description of the reliable delivery protocol consists of the state transition diagrams for the DME and RME, the state maintained by the DME and the RME including the required persistence other than the stream persistence, the message types used by the delivery protocol, the protocol actions illustrated in the state transition diagrams, and a separate out-of-band request reset protocol. FIG. 5 illustrates the DME state transition diagram 402.

The DME initiates processing due to message receipt from the RME, expiration of one of the following timers: Decision-Expected Timeout, Get Request Timeout, and change in state of messages in the message pool (the processing of DME/RME reset messages is described below). For processing due to message receipt, the action performed depends on the current stream state at the DME. If a stream state is unlisted, then assume the action is "ignore."

At the Q/U state 504, if Request message is received for time tick t, the DME stream transitions to the Q/G state 506. A Request message from the RME to the DME represents a G (Get) tick at the DME. The Request message contains the tick corresponding to the Request message, a timeout value that indicates how long the request shall be retained by the DME, an optional filter that is used to select data messages that satisfy the request, and a tick indicating the start of a range that ends at the current request's tick. The range represents the gap between the last request message and the current one, as seen by the RME, to be filled with L/R ticks.

If there is an unassigned message available in the message pool that satisfies this request, the DME stream further transitions from the Q/G state 506 to the V/U state 508 and a Data message is sent to the RME. The Data message represents a V (Value/Data) tick value, and contains the following values: the tick corresponding to the Data message, the priority of the Data message, the reliability level, i.e. best-effort or reliable, of the Data message, the tick corresponding to previous message of the same priority and reliability level, if known, the time the corresponding request waited at the DME before being satisfied (this is used by the RME to estimate the round trip time), a Boolean value indicating whether the message is a potential duplicate, a Boolean value indicating whether the message is expired, and the payload of the message, which is empty if the expired Boolean is true.

If the Request message contains a timeout, and the timeout value in the request remaining is sufficiently large, a Request Ack message is sent. A Request Ack message acknowledges a previously sent Request message. This acknowledgement is non-persistent and causes the RME to resend a Request message less frequently. This Request Ack message contains the DMEVersion of the sender.

If a Decision message is received at the Q/U state 504, the DME stream transitions to the L/D state 510 and a Finality message is sent. The Decision message represents an L/D tick at the RME and the Finality message represents a Lost/Discarded and Decided tick value at the DME.

Likewise, if the RME receives a Reject message at the Q/U state 504, the DME stream transitions to the L/D state 510 and a Finality message is sent. A Reject message from the RME represents an L/R tick.

If, at the Q/U state 504, the DME receives an Accept message from the RME, the DME stream transitions to an L/D state 510, sends a Finality message and issues a warning to the RME. An Accept message from the RME represents an L/A tick.

Turning to the Q/G state 506, once an unassigned message is available in the message pool that satisfies the current Request message from an RME, the DME stream transitions to the V/U state 508 and sends a Data message to the RME. If the DME receives an Accept or Reject message from the RME, the DME transitions to an L/D state 510 and sends a Finality message.

If a new Request message is received during the Q/G state 506 that contains a different filter than that stored in the stream, then the new request replaces the old request. Similarly, a new timeout replaces any old timeout. If the current request contains a timeout, and the time remaining is sufficiently large, a Request Ack message is sent.

If a Decision message or a Reject message is received at the Q/G state 506, the DME stream transitions to the L/D state 510 and, if a Reject message was received, a Finality message is sent to the RME. If, at the Q/G state 506, the DME receives an Accept message from the RME, the DME stream transitions to an L/D state 510, sends a Finality message and issues a warning to the RME.

A Get Request Timeout may occur during the Q/G state 506. This process timer expires when the timeout for an individual get request expires. If this timeout occurs, the corresponding Q/G tick state 506 is transitioned to the L/D state 410 and a Finality message is sent.

During the V/U state 508, if a Request message is received from the RME, the assigned Data message is resent and no state change occurs at the DME. It should be noted that since the RME can forget G ticks due to a crash failure, it could issue a different request with a different filter after recovery. This is harmless since one of two things will occur when the DME gets the new request: (1) the DME has not yet assigned a V, in which case it can eventually assign a V that satisfies the new filter, (2) the DME has already assigned a V that satisfies the old request, and will resend that to the RME, which the RME can reject if it has no use for it.

If an Accept message is received at the V/U state 508, the RME stream transitions to the L/D state 510 and a Finality message is sent to the DME. On the other hand, if a Reject message is received, the RME transitions to the L/D state 510, sends a Finality message and, in the message pool, changes the state of the message corresponding to the current tick to unassigned. If a Decision message for time tick t is received, the RME changes the state of the message in the message pool corresponding to this tick to unassigned, marks the message as a potential duplicate, and transitions to the L/D state 510.

When a message in the message pool changes state to unassigned, the DME checks if it can be assigned to satisfy a Q/G tick in any stream. If so, it is assigned to a stream, the state in that stream is changed to the V/U state 508, and a Data message is sent to the corresponding RME.

If a DecisionExpected Timeout occurs during the V/U state 508, the DME will repeat (for liveliness, due to the possibility of message loss) a DecisionExpected message for a tick t that contains V/U. The DecisionExpected message is sent by the DME to request a decision (A, R, or D) for an L or V tick.

In addition, as the result of an administrative action or policy, messages in the message pool may be discarded. If such an action is carried out (labeled "Admin Expiry" in FIG. 5), the associated message is marked consumed in the message pool (and will eventually be discarded).

If duplicates are acceptable, an administrative action or policy can be used to transition a V/U tick 508 to L/D 510, change the state of the message in the message pool to unassigned and duplicate to true. A typical administrative policy may be to do this when a V/U tick has not been accepted or rejected by the RME for a long interval of time.

At the L/D state 510, if a Request, Accept or Reject message is received, the RME sends the DME a Finality message. The L/D state 510 is the final state and, thus, the DME remains in the L/D state 510.

The RME maintains a protocol state stream (consisting of knowledge and decision sub-streams) representing what it has seen of the DME's protocol state stream in persistent storage. How this persistent storage is efficiently maintained is described in detail below. It is safe for the RME to forget G tick values when it crashes, since these are "get" requests on behalf of consumers that got disconnected. The RME also maintains a non-persistent variable, latestDMEVersion, which records the maximum DMEVersion it has seen on either a GetAck or Reset message sent by the RME.

Figure 6:
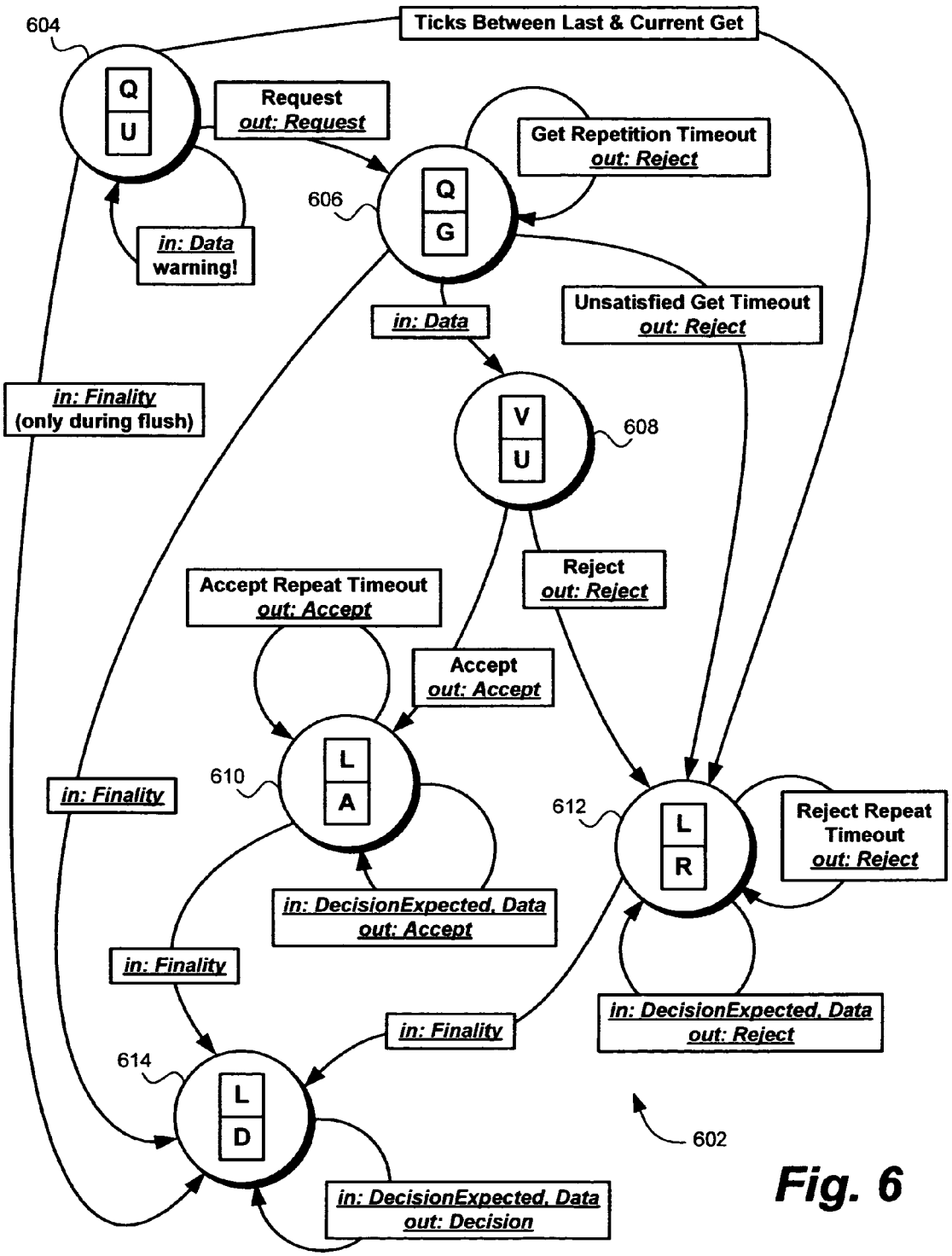
FIG. 6 illustrates a state transition diagram for the normal execution states of ticks in an exemplary protocol stream at a RME, as contemplated by the present invention.

FIG. 6 illustrates the RME state transition diagram 602. Processing at the RME may occur due to interaction with a consumer, message receipt from the RME, or expiration of one of the following timers: Eager Get Timeout, Slowed Get Timeout, Get Request Timeout, and Accept Repeat and Reject Repeat Timeouts.

During the Q/U state 604, if a consumer has issued a new request, the DME stream is transitioned from a Q/U state 604 to a Q/G state 606 at the next tick as provided by the Tick-Generator for the stream (see below). Furthermore, the "slowed" bit for the current tick is cleared, and a Request message is issued to the DME. All Q/U ticks between the last Q/G and the current Q/G are transitioned to the L/R stream state, and a Reject message is sent. This corresponds to the "Ticks Between Last & Current Get" transition in FIG. 6. Note that a timeout value is always associated with a Get request. If the consumer specifies a timeout, then that value is used in the Get request (and stored with the Get tick). Otherwise, a suitably large timeout is assigned by default. This allows the RME to make progress if the DME fails for an extended period of time.

If, at the Q/U stream state 604, a Data message is received, the message is ignored and the RME issues a warning to the DME.

If, at the Q/U stream state 604, a Finality message is received for time tick t during a flush (described below), the stream state is transitioned to L/D 614.

Upon receiving a DecisionExpected message for time tick t at the Q/U stream state 604, the RME stream transitions to the L/R state 612. Furthermore, the RME sends a Reject message and a warning is issued to the DME (not shown).

At the Q/G stream state 606, a Data message from the DME causes the RME steam to transition to the V/U state 608 and check if the message satisfies the filter of the Get request. If the message satisfies the Get request filter and the consumer is still connected, the RME delivers the message to the consumer (the steps when the consumer commits or aborts are described below). Otherwise, the stream transitions to the L/R state 612 and a Reject message is sent.

If, at the Q/G stream state 606, a Finality message is received for time tick t, the stream state is transitioned to L/D 614. If a DecisionExpected message for time tick t is received that the Q/G stream state 606, the Get request is resent. No state transition occurs. If a RequestAck message for time tick t with DMEVersion d is received that the Q/G stream state 606, and d>=latestDMEVersion, then the RME sets latestDMEVersion equal to d and the "slowed" bit for this tick. Finally, if a Get Request timeout occurs for an individual Get request, the corresponding Q/G tick 606 is transitioned to L/R 612.

Turning to the V/U stream state 608, if a V/U tick is successfully consumed and committed by a consumer, the tick value is changed to L/A 710 and an Accept message is sent. On the other hand, if the V/U tick consumption is aborted, the tick value is changed to L/R and a Reject message sent. The message in the V tick can be discarded.

If the RME receives a Data message for time tick t at the L/A stream state 610, the L/R stream state 612 or the L/D stream state 614, the RME sends an Accept message, a Reject message or a Decision message, respectively. Similarly, if the RME receives a DecisionExpected message for time tick t at the L/A stream state 610, the L/R stream state 612 or the L/D stream state 614, the RME sends back an Accept message, a Reject message or a Decision message, respectively.

If a Finality message is received for time tick t at either the L/A state 610 or the L/R state 612, the stream state is transitioned to the L/D state 614.

Besides the timeouts discussed above, four other timeouts may occur at the RME: an Eager Get timeout, a Slowed Get timeout, an Accept Repeat timeout, and a Reject Repeat timeout. If an Eager Get timeout occurs, the RME iterates through each Get request with the slowed bit unset. If the timeout in the Get request has been exceeded, then the tick is changed to a Q/R state and a Reject message is sent. Otherwise, the Get is resent to the DME.

The Slowed Get timeout timer is expected to expire an order of magnitude less frequently than the Eager Get timeout. When this timer expires, all slowed bits are unset and each corresponding Get is resent to the DME.

After an Accept Repeat or Reject Repeat timeout occurs, the Accept or Reject message is repeated.

Recall that message requests by a RME are non-persistent. Therefore, when a DME recovers, it losses all knowledge of any outstanding requests previously submitted by an RME. Since some of these requests may have been "slowed", there may be significant delays before an RME resubmits the request. Thus, it is necessary to reset each RME when the DME recovers. This is a simple out-of-band protocol.

When a DME recovers, it sets the reset bit on each stream recovered from persistent storage. The DME then sends a "Reset Request Ack" message to each RME and starts a "Reset Repeat" timer. When the timer expires, the DME examines all streams and resends the Reset Request Ack message to each RME whose reset bit is still set. The Reset Request Ack message contains two arguments: the name of the stream, and the DMEVersion which disambiguates this reset request from all previous reset messages. The DME initiates at most one reset at a time. When all streams have been reset (i.e. all streams have the reset bit unset), then the Reset Timer is stopped and no further Reset Request Ack messages are sent.

When an RME receives a Reset Request Ack message with DMEVersion d, it checks if d is greater than or equal to latestDMEVersion. If so, the latestDMEVersion is set to d, all Gets in the "slowed" state are reset to the "eager" state, and a Reset Request Ack Ack message is sent back to the DME. The Reset Request Ack Ack message contains the same two arguments as the Reset Request Ack message: the id of the stream, and the DMEVersion of the original Reset request. If d is less than latestDMEVersion, the reset message is discarded.

If the DME receives a Reset Request Ack Ack with a DMEVersion older than that of the original Reset Request Ack message, the Reset Request Ack Ack is ignored. Otherwise, the reset bit is unset on the corresponding stream.

For convenience, the tables below provide a summary of exemplary messages contemplated by the present invention. Messages can be classified into two categories: messages sent from the DME to the RME (shown in Table 3) and messages sent from the RME to the DME (shown in Table 4).

TABLE 3

Messages sent from the DME to the RME

| | |
|---|---|
| Request Ack message | Acknowledges a previously sent request message. This acknowledgement is non-persistent and causes the RME to resend a request message less frequently. This message contains the DMEVersion of the sender. |
| Data message | Represents a V (Value/Data) tick value, it contains the following values: the tick corresponding to this data message, the priority of the data message, the reliability level (i.e. best-effort or reliable) of the data message, the tick corresponding to previous message of the same priority and reliability level if known, the time the corresponding request waited at the DME before being satisfied; this is used by the RME to estimate the round trip time, a Boolean value indicating whether the message is a potential duplicate, a Boolean value indicating whether the message is expired, and the payload of the message, which is empty if the expired Boolean is true. |
| Finality message | Represents a L/D (Lost/Discarded and Decided) tick value. |
| Decision Expected message | Sent by the DME to request a decision (A, R, or D) for an L or V tick. |
| Reset Request Ack message | Associated with a stream, but not assigned a tick; instead, the message is assigned a DMEVersion, to be used in the Request Reset protocol. |
| Request Highest Generated Tick message | Sent by the DME to request the highest tick generated by the RME; it contains a unique request id. |
| Cardinality Info message | Used by the DME to enforce cardinality by telling the RME not to issue Request messages for an existing stream. In this case, the message contains the following values: the id of the stream and the current cardinality of active consumers on the destination. |

TABLE 4

Messages sent from the RME to the DME

| | |
|---|---|
| Request message | Represents a G tick and contains the following values: the tick corresponding to this request message, a timeout value that indicates how long the request shall be retained by the DME, an optional filter that is used to select data messages that satisfy the request, and a tick indicating the start of a range that ends at this request's tick. This range represents the gap between the last request message and the current one, as seen by the RME, that is to be filled with L/R ticks. |
| Accept message | Represents an L/A tick. |
| Reject message | Represents an L/R tick. |
| Decision message | Represents an L/D tick. |
| Reset Request Ack Ack message | Associated with a stream, but not assigned a tick. Instead, the message contains a DMEVersion which corresponds to the DMEVersion of a previously sent Reset Request Ack message, to be used in the Request Reset protocol. |
| Highest Generated Tick message | Contains the highest tick generated by the RME on this stream, and the unique message id that correlates with the corresponding Request Highest Generated Tick message. |

Certain failure conditions may leave a stream in an unrecoverable state. In these cases, the stream may be flushed, putting it in a consistent state, after which a new stream may replace the flushed stream. When a stream is created, it is given a unique id.

In order to carry out stream creation and a flush protocol, it is contemplated that the Flushed, Not Flushed, and Cardinality Info messages are sent from the DME to the RME. The Flushed message contains a stream id and indicates to the RME (in response to an "Are You Flushed" or "Create Stream") that the identified stream has been flushed.

The Not Flushed message contains a stream id and indicates to the RME (in response to an "Are You Flushed" or "Create Stream") that the identified stream is not flushed. The Not Flushed message may include a request id to allow the RME to ensure that this is not an old message (by comparing with the request id of the corresponding "Are You Flushed" message) and a list of finality prefixes, each finality prefix indicating the latest L/D tick in the stream for a given priority and reliability level.

The Cardinality Info message is used by the DME to enforce cardinality by denying requests to create a stream. In this case the message contains a request id that corresponds to the create stream request and the current cardinality of active consumers on the destination.

Conversely, it is contemplated that the Create Stream and Are You Flushed messages sent from the RME to the DME are provided in order to carry out stream creation and a flush protocol. The Create Stream message is used to initiate the process of creating a stream. It contains the id of the RME, and a unique id to identify the message but no stream id, as this id is defined by the DME. The Are You Flushed message is used by the RME to query the status of the current stream. It contains the id of the stream and a unique id to identify the message.

Upon receipt of a Create Stream message, the DME determines if a stream for the corresponding RME already exists. If so, the DME sends a Not Flushed message with the id of the Create Stream message. Otherwise, if the corresponding destination has cardinality equal to one and there is a stream for some other RME, then a Cardinality Info message is sent with the id of the Create Stream message and the current cardinality. Otherwise, a new stream is created for the RME and a Not Flushed message is sent with the id of the Create Stream message.

Upon receipt of an Are You Flushed message, the DME determines if the stream has been flushed. If so, the DME sends a Flushed message with the id of the flushed stream. Otherwise, a Not Flushed message is sent with the id of the Are You Flushed message.

At the RME side, upon receipt of a Flushed message, the RME checks if the stream id in the message matches the RME's stream id. If so the stream is cleaned up and deleted.

If a Not Flushed message is received, the RME checks whether this message is in response to a pending Create Stream message. If so, the stream is created. Otherwise, if this message is in response to an Are You Flushed message and the stream is non-existent, the stream is created.

Upon receipt of a Cardinality Info message, the RME checks if this message is in response to a pending Create Stream message. If so, the consumer that issued the create stream request is informed that the request has been denied due to cardinality constraints.

In response to any other message, the stream id in the message does not match the RME's stream id, the RME sends an Are You Flushed messages with the stream id in the message and discards the message. If a consumer requests to create a stream, the RME generates a unique id and sends a Create Stream message to the DME.

Finally, the RME maintains a timer to indicate when messages have not been received from the DME during a long enough time period. When this timer expires, an Inactivity timeout occurs and the RME sends an Are You Flushed message with the RME's stream id.

In a particular configuration of the present invention, streams are mapped to data structures that encode information in a compact form with low overhead access in order to implement the delivery protocols. The stream data structures and their persistence for the reliable delivery protocol are described below. Since the RME endpoint of a stream may be used to generate ticks for the stream, tick generation and persistence is also discussed. Finally, stream recovery mechanisms (from a backup, stale or otherwise) are explained.

Recall that streams are indexed by ticks, which are used to sequence the states in a stream. Tick generation is based on a combination of system clocks and counters. Persistence of clock values in the event of a crash is based on intervals. The tick generator is persisted at the RME that is required to generate ticks.

The stream data structure maintains complete information for every tick in the stream. A compact representation is achieved by grouping ranges of similar ticks whenever possible. This representation allows low overhead access since tick state may be determined by comparing tick values to ranges.

During protocol operation, a stream has the regular expression form:

$$([L/D])*([V/U]|[Q/G]|[L/(ARD)])*([Q/U])*$$

The default state is Q/U, and the protocol makes progress by building a prefix of L/D values in the stream. Thus, the prefix and suffix are both encoded by a single tick value: the prefix is encoded by a tick value representing the last L/D in the prefix; and the suffix is encoded by a tick value representing the first Q/U in the suffix. That is, the prefix and suffix contribute a constant size to the overall storage requirements of the stream.

The non-constant size of a stream is determined by the size of the range between the prefix and suffix. At the DME, the size of this range is determined by the number of undecided messages (i.e. V/U ticks corresponding to sent messages that have not been accepted or rejected) and the number of outstanding RME data message requests (i.e., Q/G ticks). At the RME, the range between the prefix and suffix is determined by the number of undecided messages (i.e. V/U ticks corresponding to messages for which an accept/reject decision has not yet been made), the number of decided but un-finalized states (i.e., L/A or L/R ticks), and the number of outstanding RME data message requests (i.e., Q/G ticks).

Thus, the stream data structure remains compact if this intermediate range does not grow excessively. It may be assumed that the steady state of the protocol has some manageable bound on the size of this intermediate range. This bound can be monitored by computing the gap between the L/D prefix and the Q/U suffix. In cases where this gap grows too large (e.g., receiver failure, network partition), an administrative policy may be in place to take appropriate action (e.g., generate an administrative alert, throttle consumers, reject data message requests etc). That is, the stream data structure is designed to give maximum performance during protocol steady state.

Stream Representation

A stream data structure can be defined as follows:

```
public class ReliableStream {
    TickGenerator  generator;
    MsgSet         undecided;
    GetSet         gets;
    TickRange      ticks;
}
```

In this structure, generator is a unique (to the stream), monotonic tick generator. Undecided is the set of undecided messages which have been placed in the stream. Gets is the set of outstanding data message requests from an RME, and ticks is an encoding of each tick state.

Thus, a TickGenerator generates unique, monotonic ticks on demand at the RME. A MsgSet is a collection of messages, indexed by tick value. A GetSet is a collection of data message requests (including selectors), indexed by tick value. A TickRange is a data structure which stores the state of each tick and provides the following interface:

```
public interface TickRange {
    void setTick(Tick time, State value);
    State getTick(Tick time);
}
```

The implementation of TickRange attempts to compact the stream by combining adjacent tick values with the same state. Checking the state of a tick (i.e., the implementation of "getTick") amounts to checking the range membership of the tick. Note that the TickRange data structure only stores state values. The data message associated with a value tick is stored in the message set, not in the TickRange, since many ticks will not have messages associated with them. We assume the TickRange interface includes convenience methods for setting ranges of ticks to a particular state.

In a particular implementation of the invention, the undecided set is always persisted at the DME. In deployments where RME or link failure is common and retransmission of messages is prohibitively expensive, the undecided set is also persisted at the RME. Note, however, that this is an optimization. Under more typical deployments the RME will not persist the undecided set. It is assumed that messages in the undecided set are persisted along with their assigned tick and the identity of the RME they have been assigned to.

In one embodiment of the invention, the "get" set is never persisted. At the DME, it may be assumed that RMEs will resubmit get requests after the DME recovers. At the RME, local get requests are on behalf of local consumers. If the RME fails, it can be assumed that local consumers will reconnect (perhaps at the same RME after recovery) and resubmit their requests.

Figure 7:
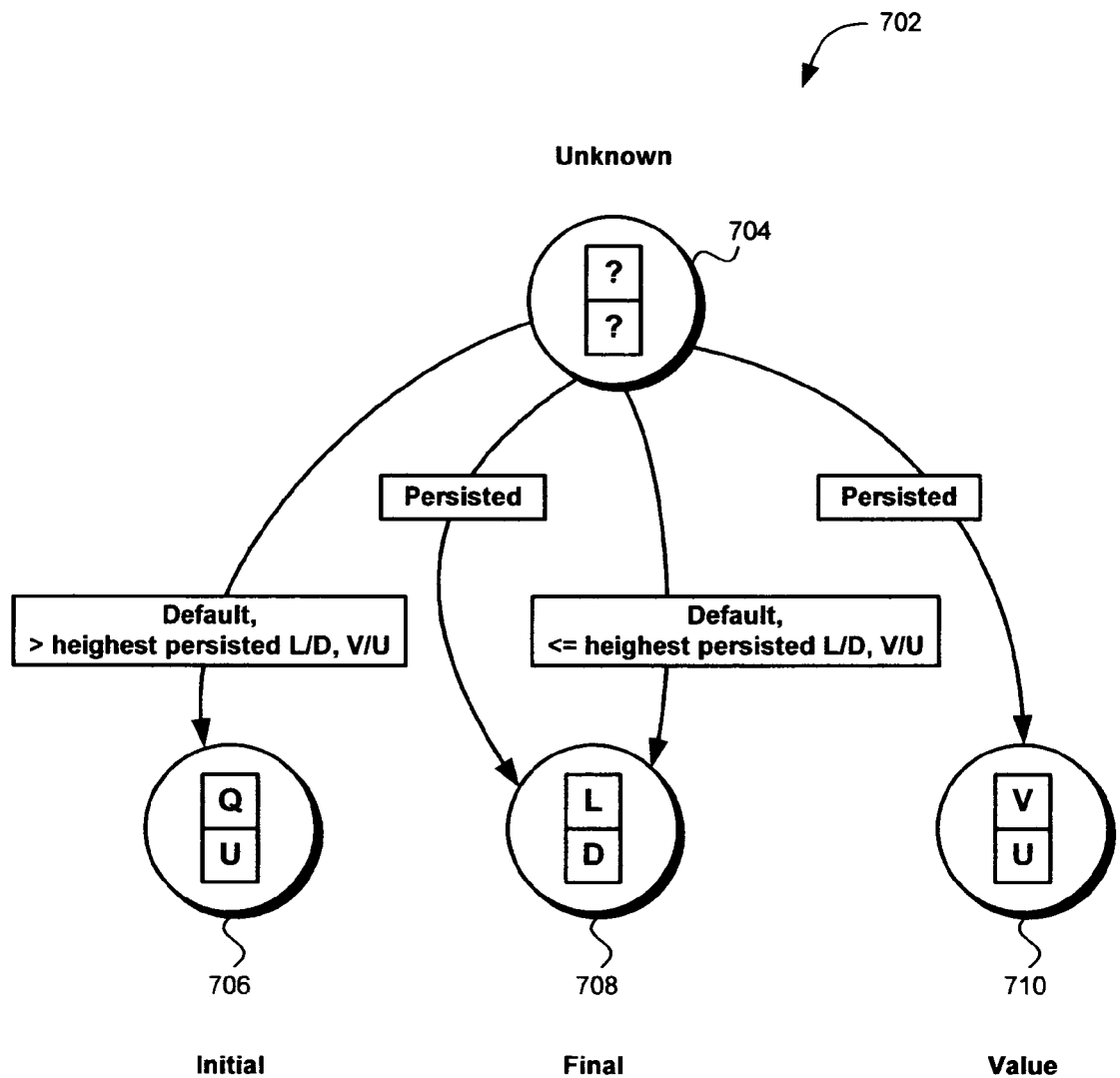
FIG. 7 illustrates a state transition diagram depicting recovery states of ticks in a protocol stream at a DME stream, as contemplated by one embodiment of the present invention.

In one embodiment of the invention, the TickRange "ticks" is only partially persisted. In particular, it is only necessary to persist sufficient tick range information to derive the allowable starting states for DMEs and RMEs. If recovery is viewed as a state transition, then the diagram in FIG. 7 illustrates the recovery transitions 702 for the DME stream. The stream element starts in the "unknown" state (i.e., ?/?) 704. The final states in these transitions are the initial states in the protocol transitions described above.

TickRange is persisted at the DME so that it can transition each tick to one of the following recovery states: Q/U 706, V/U 710, and L/D 708. Since Q/U 706 is the default state, it is not persisted. If no other transition is valid for a tick, then that tick is transitioned to Q/U 706. This corresponds to the "default" transition in FIG. 7.

V/U 710 ticks are not persisted in the TickRange, but instead are recovered by consulting the tick values persisted with the messages in the undecided set. Each such tick is restored by following the "persisted" transition from ?/? 704 to V/U 710 in FIG. 7.

L/D 708 ticks are persisted in the TickRange either explicitly, as individual ticks or ranges, or implicitly, as derived ticks from an explicitly persisted tick or the "maxTick" value provided by a TickGenerator. An explicitly persisted L/D 708 is restored via the "persisted" transition from ?/? 704 to L/D 708 in FIG. 7. Any non-L/D tick less than the last (i.e. highest tick value) persisted L/D 706 or V/U 710 tick is restored as L/D 708. This corresponds to the "Default, <=highest persisted L/D, V/U" transition in FIG. 7.

Figure 8:
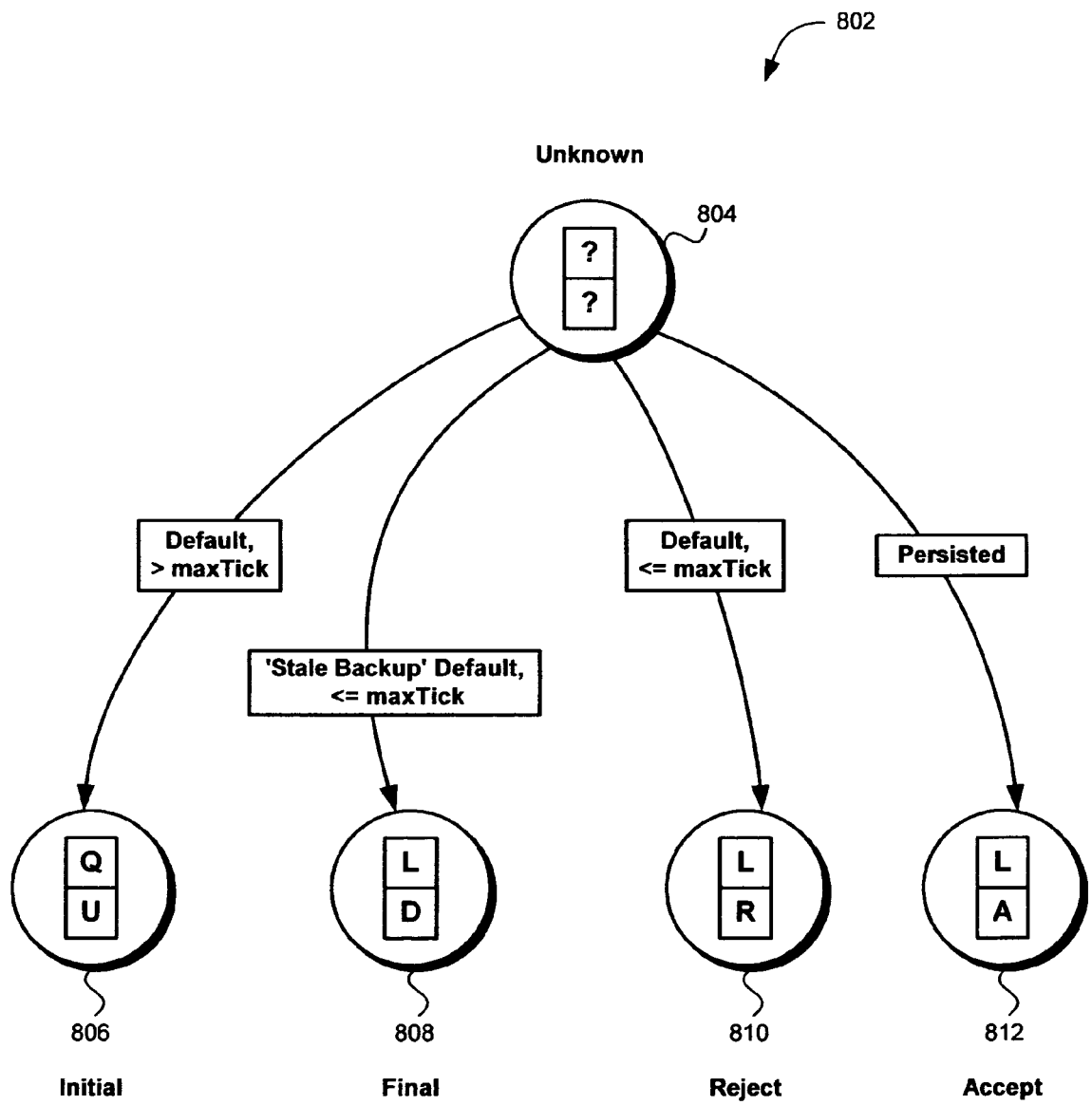
FIG. 8 illustrates a state transition diagram depicting recovery states of ticks in a protocol stream at a RME stream, as contemplated by one embodiment of the present invention.

FIG. 8 illustrates the recovery transitions 802 for the RME stream. Each stream element again starts in the "unknown" state (i.e., ?/?) 804, and the final states are the initial states in the protocol transitions given above.

At an RME, the TickRange is persisted so that we may transition each tick to one of the following recovery states: Q/U 806, L/A 812, L/D 808, L/R 810. As in the DME case, Q/U 806 is the default state and is not persisted. If no other transition is valid for a tick, then that tick is transitioned to Q/U 806. This corresponds to the "default" transition in FIG. 8. Note that the recovery states essentially only encode decision sub-stream information. This is because messages are not typically persisted at the RME.

L/A ticks 812 are persisted and restored on recovery. This corresponds to the "persisted" transition in FIG. 8. The prefix of L/D ticks 808 is persisted as a range (i.e. a single tick value representing the maximum tick in the range). A set of L/R ticks 810 are implicitly persisted based on the "maxTick" value provided by the persisted TickGenerator. All non-L/A states before "maxTick" are recovered as L/R 810. This corresponds to the "default" transition in FIG. 8. Thus note that, since an L/D tick 808 is not always persisted, it is recovered as L/R 810, which turns into L/D 808 when its reject repetition timeout expires, a Reject message is sent to the DME, and the expected Finality message arrives.

In one embodiment of the present invention, when streams are recovered from a stale backup, all messages at a DME in the local message pool are marked as unassigned and potential duplicates. Furthermore, all existing streams at the DME, for communicating with the RMEs, are unilaterally discarded (the stream creation and flush protocol described clarifies how this affects the RMEs). Discarding the streams is necessary since a stream in the DME's stale backup may already have been flushed. If new messages are added to such a flushed stream, they could be incorrectly discarded due to a stale accept message. Additionally, all messages in the undecided set must be marked as potential duplicates and the range of lost stream state must be determined.

The marking messages in the local message pool as unassigned and potential duplicates, as well as marking all messages in the undecided set as potential duplicates is necessary because unassigned or undecided messages may have been acknowledged after the backup was generated, but before the failure occurred. Therefore, all unassigned or undecided messages are now potential duplicates. Determining the range lost stream state is necessary because stream state may have been changed after the stale backup, but before the failure occurred. For example, new messages may have been generated and acknowledged after the stale backup. Information for these messages may be irretrievably lost since it is not recorded in the stale backup.

Recovering from a stale backup at an RME requires all Q/U states before "maxTick" be transitioned to L/D. This corresponds to the "stale backup" transition in FIG. 9. It is assumed that, even though the backup is stale, an administrator is able to reset the TickGenerator so that "maxTick" is later than any previously generated tick. It is also assumed that all previous recovery actions have already taken place before we determine lost stream state.

Elements of a stream are persisted in response to certain state transitions in the protocol. Some of these transitions may be batched, as indicated below, depending on the performance requirements of the protocol. At the DME, the assign, expire, accept/reject and finality transitions require stream persistence.

During an assign transition, the DME must persist the tick and target RME (i.e. target stream) for the message. For an expire transition, the tick of an expired message should be persisted at the time the message is made unavailable to RMEs. During an accept/reject transition, the tick of an accepted or rejected message should be persisted at the time when the state is transitioned to finality (L/D). This action may be suspended and batched as long as the associated data messages are not removed until the batch of actions has been persisted. At a finality transition, if finality replaces a V/U state with L/D, then the L/D tick must be persisted when the transition takes place.

The finality horizon may be advanced (and re-persisted) for any suffix of L/D states beyond the current L/D prefix. This action may be used as an optimization for certain actions above. For example, if the current finality horizon is F, and a batch of messages from F to tick t are transitioned to finality (as a single atomic step), then the individual persistent actions may be replaced by the single persistent action of moving the finality horizon to t.

At the RME, the accept and finality transitions require stream persistence. During an accept transition, the tick of an accepted message should be persisted at the time when the decision sub-stream transitions to the A state. Note that the message may also be discarded at this time. During a finality transition, a tick with decision state A which transitions to finality (L/D) must be persisted at the time of transition. This action may be suspended and batched as long as the previous A decision state remains persisted until the batch is persisted. The finality horizon is advanced (and re-persisted) for any suffix of L/D states beyond the current finality horizon. Typically, this action is used to optimize a batch of finality transitions between the current finality horizon and the end of the batch.

One embodiment of a Best-effort Delivery protocol contemplated by is a specialization of the Reliable Delivery protocol that has been described above. The main difference between the two protocols is in the use of persistence. Specifically, the best-effort delivery protocol minimizes persistence of protocol state. In addition, the best-effort delivery protocol can be executed concurrently with the reliable delivery protocol. That is, best-effort messages (i.e., messages whose reliability property is set to best-effort) can co-exist with reliable messages in the same stream. As messages are assigned to ticks in the stream, the persistence of such ticks is handled according to the delivery protocol corresponding to the reliability of the message. Best-effort messages themselves are not persisted by the best-effort delivery protocol. This means that best-effort messages are lost when the DME fails.

In accordance with the best-effort delivery protocol, all tick values are non-persistent at the DME. When the DME recovers from a crash, it asks the RME for the highest tick generated by the RME's tick generator, say T, using the Request Highest Generated Tick message. All ticks up to T that are not V/U are set to L/D. The DME does not respond to any requests from the RME until this initialization step is complete. Note that this initialization is needed to avoid losing messages that are assigned to stale get requests that show up after the DME recovers.

At the RME, as in the reliable delivery protocol, L/R ticks are implicitly (and cheaply) persisted because the tick generator is persistent. As in the reliable delivery protocol, L/D ticks are explicitly persisted. L/D ticks are only persisted periodically, and we may only persist the L/D prefix.

In addition, L/A ticks at the RME are not persisted for best-effort messages. Since non-persistent L/A ticks will be turned to L/R on RME recovery, the DME may see an L/R in response to a best-effort V/U message that was in fact delivered successfully. To address this problem, two kinds of L/R ticks are distinguished: L/R-normal ticks and L/R-recovery ticks. The latter are ticks that are set to L/R when the RME recovers (by reading the tick generator). When the DME receives an L/R-normal tick for a best-effort V/U tick, it unlocks the corresponding message so that it is available for redelivery, and changes the tick to L/D. When the DME receives an L/R-recovery tick for a best-effort V/U tick, it discards the corresponding message, and changes the tick to L/D. For reliable V/U ticks the DME does not differentiate between L/R-normal and L/R-recovery ticks and performs the same behavior as specified in the reliable protocol section.

The present invention also defines an ordered delivery protocol. In general, ordered delivery to competing consumers guarantees that the messages received by any consumer C from a given producer P will arrive in the order in which P produced them. To provide this general guarantee, it is assumed that a message M1 cannot be assigned by the DME to a consumer request if there is a message M0 that the DME has assigned to a separate request and the disposition of that assignment has not been decided, and such that M0 precedes M1 in the order of arrival at the DME's message pool. However, it is possible to relax this assumption when the destination's consumer cardinality is equal to one, that is, when only one consumer is connected at any given time. Thus, the ordered delivery protocol is described separately as given by the destination's consumer cardinality.

Enhancements to DME and RME behavior to ensure ordering when consumer cardinality is greater than one are now described. Ordering is per message priority and reliability pair.

At the DME, for each RME, the DME expects to see Q/G ticks in order. If the DME receives a Q/G tick for tick t, and there is a tick t'<t that is currently Q/U, it turns tick t' to L/D and pushes finality to the RME. For each RME, the DME changes Q/G ticks to V/U in increasing tick order. Of course, a later tick can be assigned a higher priority message than a lower tick. For each priority-Qos pair, the DME maintains at most one outstanding V/U tick, referred to as outstanding(p, q), where p is the priority value and q is the QoS value. The value of outstanding(p,q) is either the pair (r,t) if there is an outstanding V/U tick or nil otherwise, where r is the RME at which the V/U is outstanding and t is its tick value. The DME changes a tick t from Q/G to V/U, at any RME r, by assigning a message of priority p and qos q, only if outstanding(p,q) is nil. It then sets outstanding(p,q) to (r,t). When the DME changes a tick t from V/U to L/D, at RME r, where outstanding(p,q) is (r,t), it sets outstanding(p,q) to nil.

At the RME, the RME has at most one V/U tick for each priority-Qos pair. Thus, the RME can deliver a message that satisfies a V/U tick as soon as it arrives.

Ordered delivery for destinations with consumer cardinality equal to one assumes that cardinality enforcement is required. Cardinality enforcement is jointly done by the DME and RME. The RME ensures that it is only servicing one consumer, and the DME ensures it is servicing only one RME. We describe strict enforcement of consumer cardinality equal to one. The disadvantage of this is that a consumer that moved from one RME to another RME due to the first RME's failure will not get any messages until the first RME has recovered and informed the DME that the consumer is no longer connected to it. This loss of availability may not be appropriate for many applications which are willing to accept less strict enforcement of cardinality.

The DME ensures that it is only servicing one RME. This is done using the flush protocol as described previously. The events that trigger the start of the stream flush or stream creation protocol are presently described.

When a RME's consumer disconnects, the RME changes all V/U ticks to L/R, and requests the DME to initiate the flush protocol. When a consumer connects at a RME, the RME waits until its previous stream for this destination has been flushed, and then requests the DME to create a new stream.

When the DME receives a stream creation request from a RME, it checks whether all other RME streams are flushed. If they are, it creates a stream for this RME. Otherwise, it responds with a 'Cardinality Info' message to the RME. An RME that receives a 'Cardinality Info' message from the DME will periodically retry its stream creation request (this retry frequency will be lower than the retry frequency when no response is received from the DME).

To ensure ordering when consumer cardinality is equal to one, the DME expects to see Q/G ticks in order. If it receives a Q/G tick for tick t, and there is a tick t'<t that is currently Q/U, it turns tick t' to L/D and pushes finality to the RME. The DME changes Q/G ticks to V/U in increasing tick order. Of course, a later tick can be assigned a higher priority message than a lower tick.

For each priority-Qos pair, the DME maintains the tick value of the latest V/U tick of that priority-Qos. T is referred to as latestTick(p,q), where p is the priority value, and q is the QoS value. When a Q/G tick is changed to V/U, and this V/U is of priority p and Qos q, latestTick(p,q) is updated. The latestTick(p,q) is not changed when a V/U tick transitions to L/D.

When changing a Q/G tick, at tick t, to V/U, where V/U is of priority p and Qos q, the DME records the current value of latestTick(p,q) with this V/U tick, and then updates latestTick(p,q) to t. The value recorded with the V/U tick is referred to as prevTick, and will be sent along with the data message to the RME. Note that for a (1) best-effort message, prevTick will be non-persistent, (2) reliable message, prevTick will be persistent.

The latestTick(p,q) value is non-persistent. On crash recovery, the latestTick(p,reliable) can be recovered from the persistent reliable V/U ticks, by finding the latest persistent reliable V/U tick with priority p, say at tick t, and setting latestTick(p, reliable)=t. If there is no persistent reliable V/U tick in the protocol stream with priority p, latestTick(p,reliable) is set to zero. However, latestTick(p,q) where q is best-effort cannot be accurately recovered after a crash, so the DME initializes them to 'unknown'.

Focusing now to the RME's behavior, the RME does not change a tick to L/R while the consumer is connected. When the consumer disconnects, the RME rejects all Q/G and V/U ticks (that is, the RME changes Q/G and V/U ticks to L/R) and asks the DME to flush the stream (as described above). If the RME crashes and recovers, the consumer must have been disconnected, so the existing stream is flushed (by requesting the DME).

If t1=V1/U is the tick corresponding to a data message (call it M1) that has been received, the RME can deliver M1 if the following conditions are satisfied:

a. If prevTick for t1 is unknown, then M1 can be delivered only if there are no Q/U and Q/G ticks preceding t1, and all V/U ticks preceding t1 have been delivered.

b. If prevTick for t1 is t, then M1 can be delivered if tick t is L/D or L/A, or if t is V/U and it has been delivered.

To provide truly best-effort delivery, we can optimize delivery by not following rules a and b for best-effort messages. We deliver M1 without waiting for preceding ticks, but if eventually a preceding tick t0 is changed to V/U, where the corresponding data message M0 is also best-effort and has the same priority as M1, we will discard M0.

The foregoing description of the invention has been presented for purposes of illustration and description. It is not intended to be exhaustive or to limit the invention to the precise form disclosed, and other modifications and variations may be possible in light of the above teachings. For example, the invention may a computer program product embodied in a tangible media. The tangible media may include, but is not limited to, computer readable random access memory, read only memory, magnetic memory, optical memory and the like.

The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for delivering data, the method comprising:

instantiating a destination messaging engine, the destination messaging engine configured to distribute data from one or more producers;

instantiating one or more receiver messaging engines, the receiver messaging engines configured to request data from the destination messaging engine and transmit the data to one or more consumers;

specifying a content filter associated with each request, the content filter configured to select messages satisfying a message request;

arbitrating data in a message pool among the receiver messaging engines, the message pool configured to include data from the producers, wherein the message pool includes a state field configured to identify, at least, data that is assigned to, unassigned to, or consumed by a receiver messaging engine and wherein the message pool further includes a duplicate field configured to identify data as a potential duplicate;

storing the message pool in persistent memory;

sequencing distribution of data based on a priority value, wherein the priority value is associated with the data;

organizing data in the message pool according to priority and sequence;

abstracting one or more message streams, each message stream including, an indexed sequence of stream states, wherein each stream state describes at least the presence or absence of data at a specific messaging engine and the disposition of the data, a knowledge sub-stream configured to describe at least the presence or absence of data at the specific messaging engine, and a decision sub-stream configured to describe at least the disposition of data, including the acceptance or rejection of data in response to a consumer request;

storing the message streams in the persistent memory;

transmitting the data to the consumers in accordance with a quality of service policy, the quality of service policy including at-least-once, at-most-once and exactly-once delivery.

* * * * *